United States Patent
Saito et al.

(10) Patent No.: US 12,095,339 B2
(45) Date of Patent: Sep. 17, 2024

(54) FUEL PUMP

(71) Applicant: Hitachi Astemo, Ltd., Hitachinaka (JP)

(72) Inventors: Atsuji Saito, Hitachinaka (JP); Satoshi Usui, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 488 days.

(21) Appl. No.: 17/430,555

(22) PCT Filed: Feb. 5, 2020

(86) PCT No.: PCT/JP2020/004243
§ 371 (c)(1),
(2) Date: Aug. 12, 2021

(87) PCT Pub. No.: WO2020/175048
PCT Pub. Date: Sep. 3, 2020

(65) Prior Publication Data
US 2022/0131440 A1    Apr. 28, 2022

(30) Foreign Application Priority Data

Feb. 25, 2019 (JP) ................................. 2019-031216

(51) Int. Cl.
*H02K 5/24* (2006.01)
*F02M 51/04* (2006.01)
(52) U.S. Cl.
CPC ............... *H02K 5/24* (2013.01); *F02M 51/04* (2013.01)
(58) Field of Classification Search
CPC .. H02K 5/24; F02M 51/04; F02M 2200/8046; F02M 2200/8061; F02M 59/445; F02M 59/48; F02M 59/366

USPC ........................................................ 310/51
See application file for complete search history.

(56) References Cited

U.S. PATENT DOCUMENTS

| 2014/0099215 A1 | 4/2014 | Kawano et al. |
| 2015/0017039 A1 | 1/2015 | Usui et al. |
| 2022/0131440 A1* | 4/2022 | Saito ...................... F02M 59/48 |

FOREIGN PATENT DOCUMENTS

| JP | 2012-251447 A | 12/2012 |
| JP | 2013-174191 A | 9/2013 |
| JP | 2016-94913 A | 5/2016 |
| JP | 2018-87548 A | 6/2018 |

(Continued)

OTHER PUBLICATIONS

International Search Report (PCT/ISA/210) issued in PCT Application No. PCT/JP2020/004243 dated May 19, 2020 with English translation (five (5) pages).

(Continued)

*Primary Examiner* — Thomas Truong
(74) *Attorney, Agent, or Firm* — Crowell & Moring LLP

(57) ABSTRACT

A coil component of an electromagnetic valve is made compact to achieve both low cost and improvement in sound vibration performance. Therefore, a high-pressure fuel pump of the present invention includes: a coil 3g; a magnetic core 3e that is arranged on a side opposite to a pressurizing chamber 11 with respect to a movable core 3h and attracts the movable core 3h when the coil 3g is energized; a yoke 3q arranged on a radially outer side of the coil 3g; a cover portion 3r that covers the coil 3g from an axially outer side; and a molded portion 17 that covers a radially outer side of the yoke 3q and an axially outer side of the cover portion 3r.

6 Claims, 6 Drawing Sheets

(56) References Cited

FOREIGN PATENT DOCUMENTS

WO     WO 2016/208359 A1    12/2016
WO     WO 2017/001093 A1     1/2017

OTHER PUBLICATIONS

Japanese-language Written Opinion (PCT/ISA/237) issued in PCT Application No. PCT/JP2020/004243 dated May 19, 2020 (four (4) pages).
Extended European Search Report issued in European Application No. 20763512.9 dated Jul. 6, 2022 (seven (7) pages).

\* cited by examiner

FUEL PUMP

TECHNICAL FIELD

The present invention relates to a vehicle component, and more particularly to a fuel pump that supplies fuel to an engine at a high pressure.

BACKGROUND ART

In a direct injection type engine that directly injects fuel into a combustion chamber of an engine (internal combustion engine) of an automobile or the like, a high-pressure fuel supply pump configured to increase the pressure of the fuel has been widely used. As a conventional technique of this high-pressure fuel supply pump, for example, there is a technique disclosed in Japanese Patent Application Laid-Open No. 2016-208359 (PTL 1). FIG. 8 of PTL 1 discloses an electromagnetic drive device in which "a fixed core 812 is provided with a small diameter portion 831 on an axially outer side, that is, on a side opposite to an anchor portion 118. In addition, a fixing pin 832 is fixed to the small diameter portion 831 to press a cover portion 815 so as to be in contact with an outer diameter enlarged portion 830, and the movement of the cover portion 815 in the axial direction is thereby restricted".

CITATION LIST

Patent Literature

PTL 1: WO 2016208359

SUMMARY OF INVENTION

Technical Problem

In the above-described related art, the fixing pin 832 as a separate component is required to hold the cover portion 815, thereby causing an increase in cost due to an increase in the number of components and an increase in cost due to an increase of assembly steps. In addition, the related art has a structure in which the fixed core 812 protrudes from the cover portion 815, and thus, there is a possibility that an operation sound of an electromagnetic valve mechanism during a pump operation increases.

Therefore, an object of the present invention is to provide a fuel pump that reduces the number of assembly steps and suppresses an operation sound of an electromagnetic valve mechanism.

Solution to Problem

In order to solve the above problems, the present invention includes: a coil; a magnetic core that is arranged on a side opposite to a pressurizing chamber with respect to a movable core and attracts the movable core when the coil is energized; a yoke arranged on a radially outer side of the coil; a cover portion that covers the coil from an axially outer side; and a molded portion that covers a radially outer side of the yoke and an axially outer side of the cover portion.

Advantageous Effects of Invention

According to the present invention configured as described above, it is possible to provide the fuel pump that reduces the number of assembly steps and suppresses the operation sound of the electromagnetic valve mechanism.

Other configurations, operations, and effects of the present invention other than those described above will be described in detail in the following embodiment.

DESCRIPTION OF EMBODIMENTS

Hereinafter, an embodiment of the present invention will be described with reference to the drawings.

EMBODIMENT

First, an embodiment of the present invention will be described in detail with reference to FIGS. 1 to 6.

Figure 1:
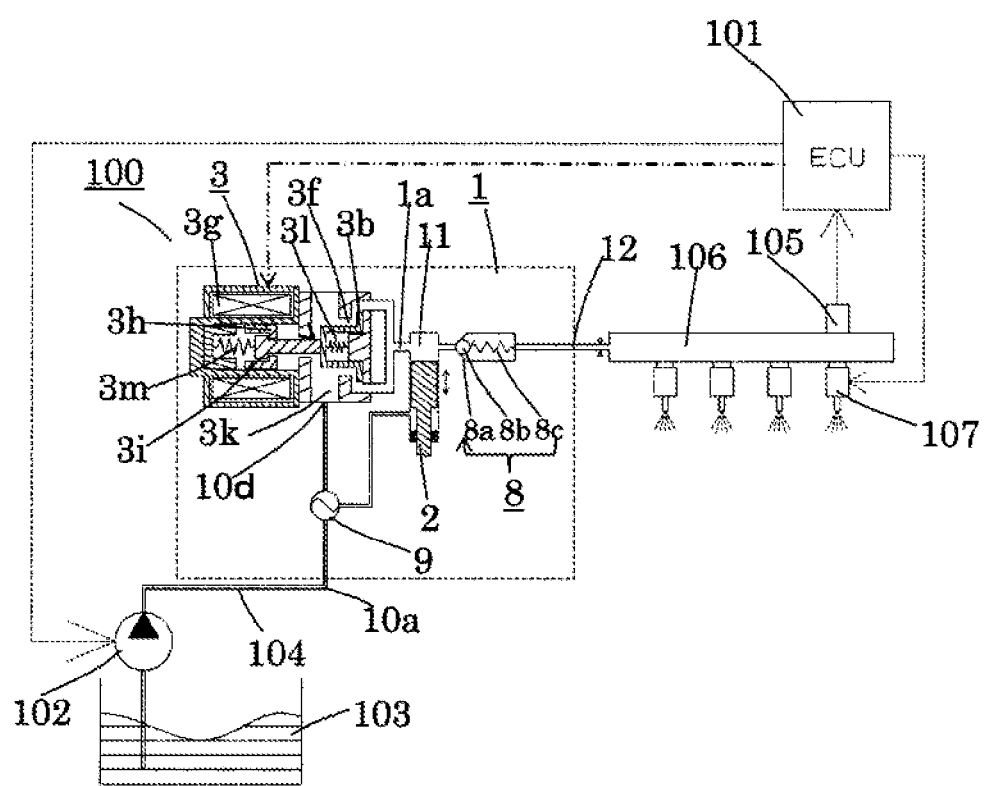
FIG. 1 illustrates a block diagram of an engine system to which a fuel pump is applied.

A configuration and an operation of a system will be described using an overall configuration diagram of an engine system illustrated in FIG. 1.

A portion surrounded by a broken line indicates a main body of a high-pressure fuel pump (hereinafter referred to as the fuel pump), and mechanisms and parts illustrated in this broken line are integrally incorporated in a body 1 (which may be also referred to as a pump body).

Fuel in a fuel tank 102 is pumped up from a fuel tank 103 by a feed pump 102 based on a signal from an engine control unit 101 (hereinafter referred to as the ECU). This fuel is pressurized to an appropriate feed pressure and sent to a low-pressure fuel intake port 10a of the fuel pump through a fuel pipe 104.

The fuel flowing from the low-pressure fuel intake port 10a of an intake pipe 5 (see FIGS. 3 and 4) reaches an intake port 31 of an electromagnetic intake valve mechanism 3 forming a capacity variable mechanism via a pressure pulsation reduction mechanism 9 and an intake passage 10d.

The fuel flowing into the electromagnetic intake valve mechanism 3 passes through an intake valve 3b, flows through an intake passage 1a formed in the body 1, and then, flows into a pressurizing chamber 11. A cam mechanism 91 of the engine applies motive power for a reciprocating motion to a plunger 2. Due to the reciprocating motion of the plunger 2, fuel is sucked from the intake valve 3b in a descending stroke of the plunger 2, and the fuel is pressurized in an ascending stroke thereof. When the pressure in the pressurizing chamber 11 exceeds a set value, a discharge valve mechanism 8 is open, and the high-pressure fuel is pumped to a common rail 106 on which a pressure sensor 105 is mounted. An injector 107 injects fuel to the engine based on a signal from the ECU 101. The present embodiment relates to the fuel pump which is applied to a so-called direct injection engine system in which the injector 107 injects fuel directly into a cylinder barrel of the engine. The fuel pump discharges a fuel flow rate of a desired supplied fuel based on the signal from the ECU 101 to the electromagnetic intake valve mechanism 3.

Figure 2:
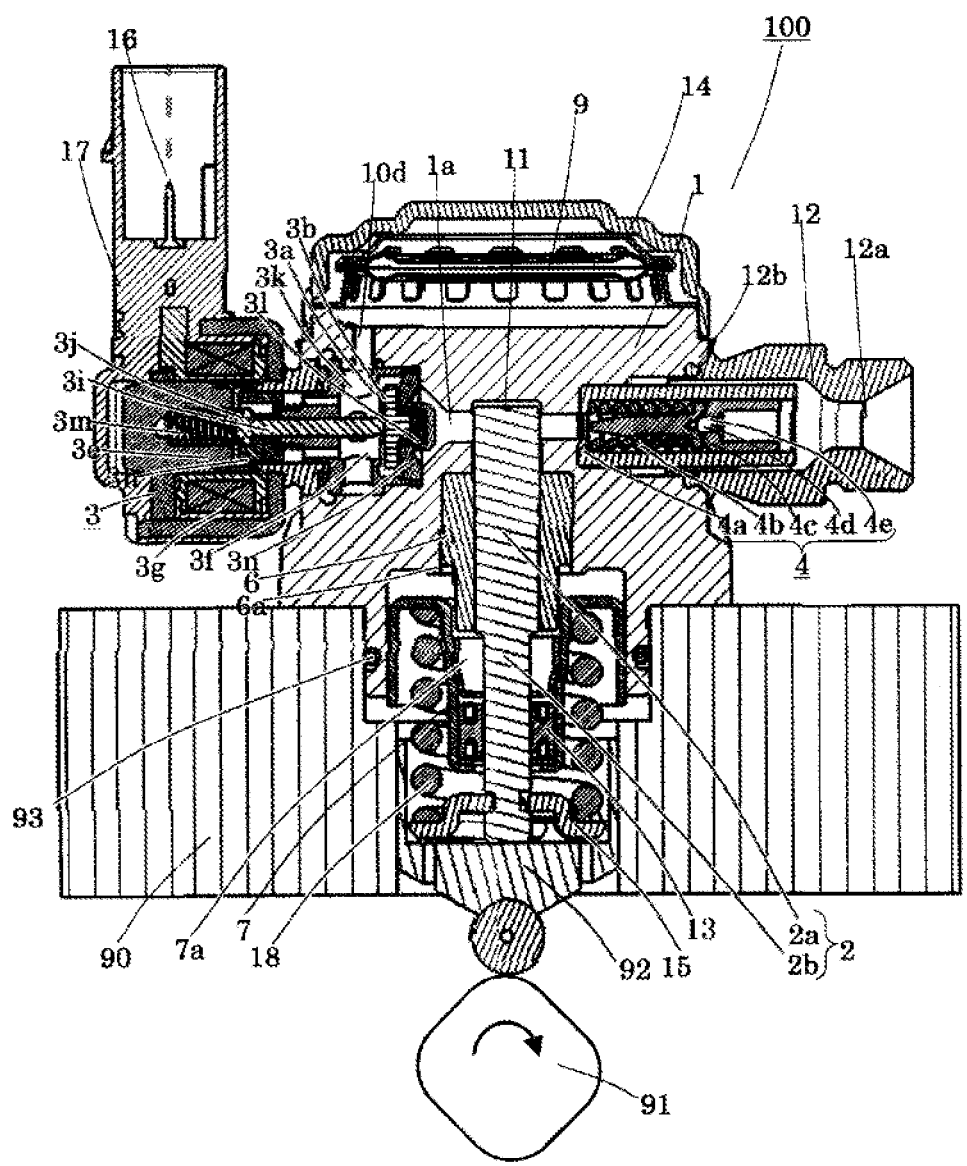
FIG. 2 is a vertical cross-sectional view of the fuel pump.
Figure 3:
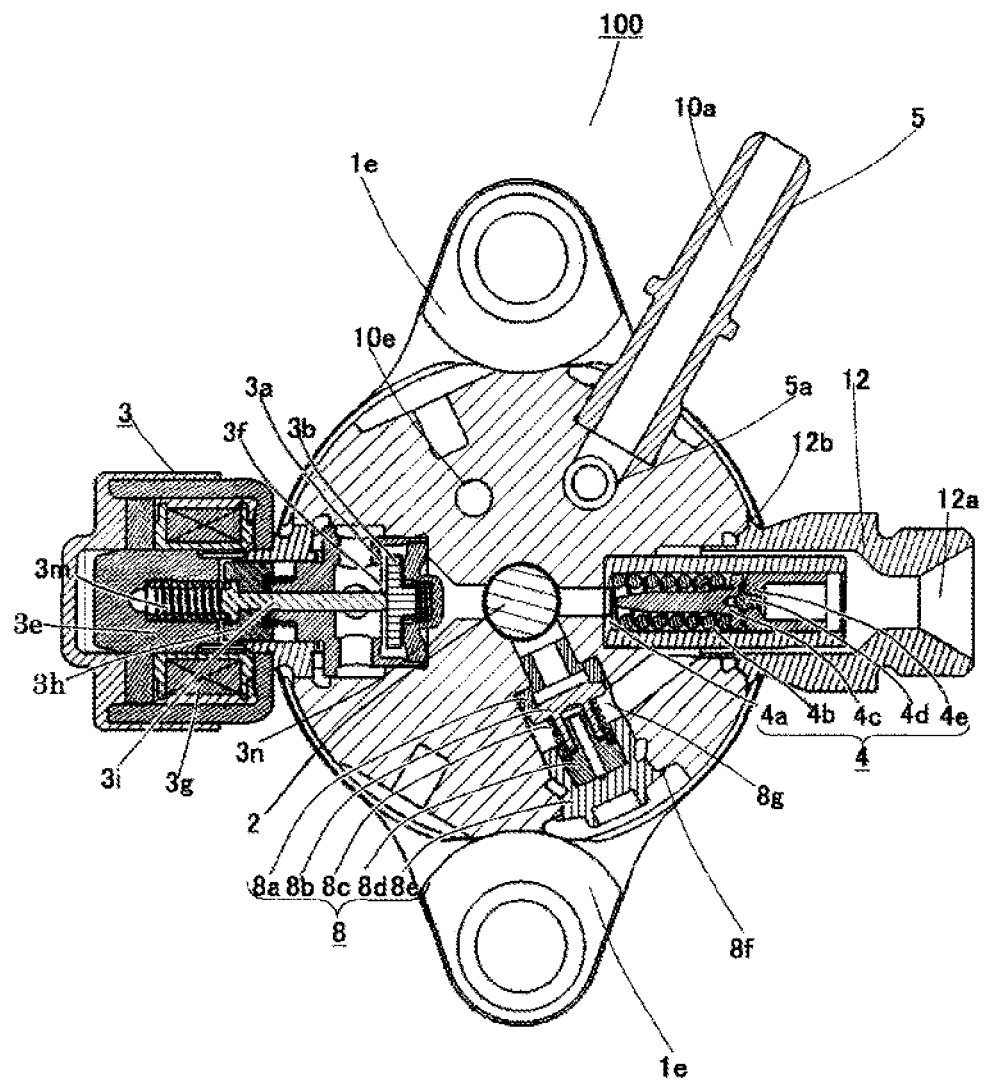
FIG. 3 is a horizontal cross-sectional view of the fuel pump as viewed from above.

FIG. 2 illustrates a vertical cross-sectional view of the fuel pump of the present embodiment as viewed in a cross section along the vertical direction, and FIG. 3 is a horizontal cross-sectional view of the fuel pump as viewed from above. In addition, FIG. 4 is a vertical cross-sectional view of the fuel pump as viewed in a vertical cross-section different from that of FIG. 2.

The fuel pump of the present embodiment comes into close contact with a fuel pump mounting portion 90 (FIGS. 2 and 4) of the engine (internal combustion engine) using a mounting flange 1e (FIG. 3) provided on the body 1 and is fixed with a plurality of bolts (not illustrated).

Figure 4:
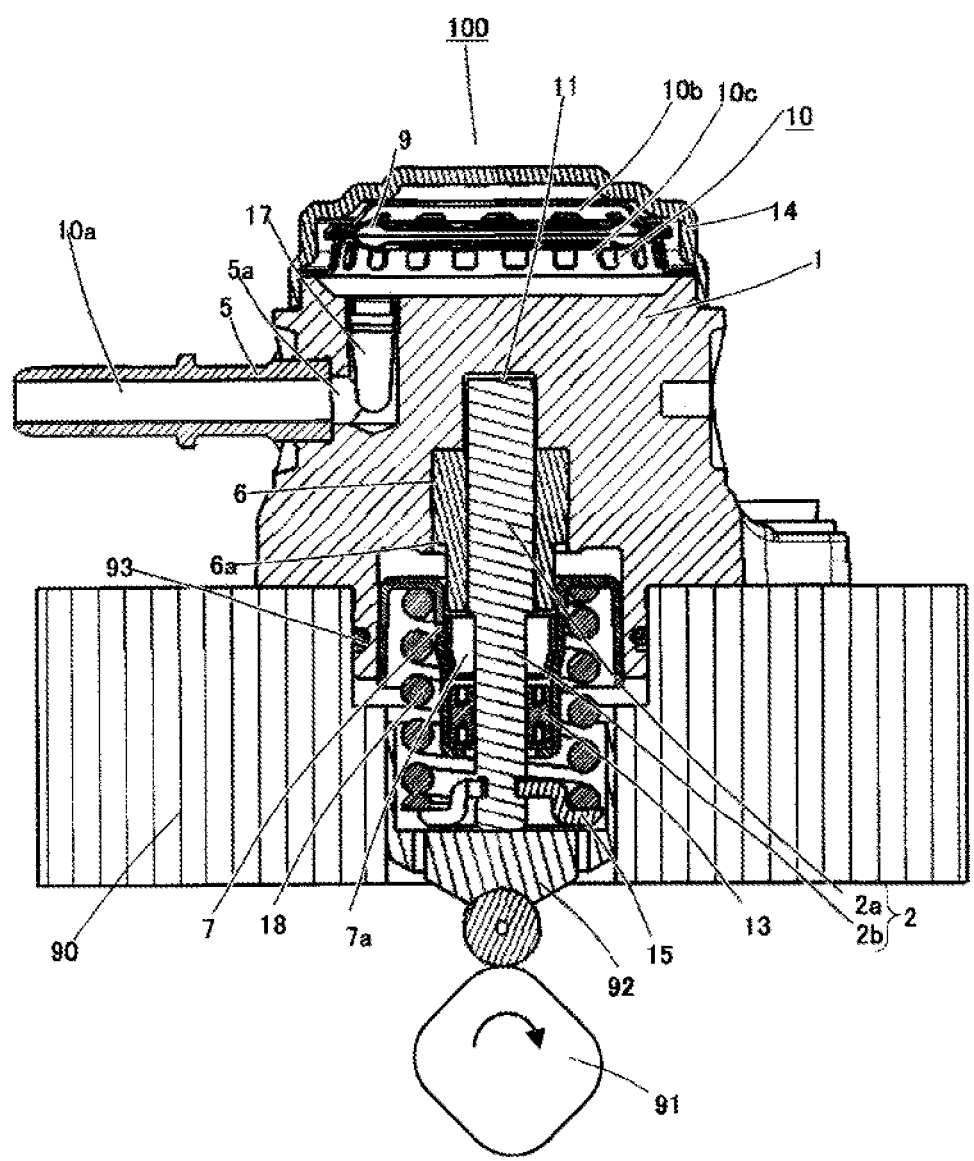
FIG. 4 is a vertical cross-sectional view of the fuel pump as viewed from a different direction from FIG. 2.

In order for seal between the fuel pump mounting portion 90 and the body 1 as illustrated in FIGS. 2 and 4, an O-ring 93 is fitted into the pump body 1 to prevent engine oil from leaking to the outside.

A cylinder 6, which guides the reciprocating motion of the plunger 2 and forms the pressurizing chamber 11 together with the pump body 1, is attached to the body 1 as illustrated in FIGS. 2 and 4. In addition, the electromagnetic intake valve mechanism 3 configured to supply fuel to the pressurizing chamber 11 and the discharge valve mechanism 8 configured to discharge the fuel from the pressurizing chamber 11 to a discharge passage are provided.

The cylinder 6 is press-fitted into the body 1 on its outer circumference side. In addition, as the body 1 is deformed toward the inner circumference (radially inward), a fixed portion 6a of the cylinder 6 is pressed upward in the drawing, and the fuel pressurized in the pressurizing chamber 11 is sealed on an upper end surface of the cylinder 6 so as not to leak to the low pressure side. That is, the pressurizing chamber 11 includes the body 1, the electromagnetic intake valve mechanism 3, the plunger 2, the cylinder 6, and the discharge valve mechanism 8.

A tappet 92, which converts a rotational motion of the cam attached to a camshaft of the engine into an up-and-down motion and transmits the converted motion to the plunger 2, is provided at a lower end of the plunger 2. The plunger 2 is crimped to the tappet 92 by a spring 18 via a retainer 15. As a result, the plunger 2 can reciprocate up and down along with the rotational motion of the cam 91.

In addition, the plunger seal 13 held at a lower end portion of an inner circumference of a seal holder 7 is installed in the state of being slidably in contact with an outer circumference of the plunger 2 at a lower portion of the cylinder 6 in the drawing. As a result, when the plunger 2 slides, the fuel of an auxiliary chamber 7a is sealed to be prevented from flowing into the engine. At the same time, lubricating oil (including engine oil) lubricating a sliding portion in the engine is prevented from flowing into the body 1.

The relief valve mechanism 4 illustrated in FIGS. 2 and 3 is constituted by a seat member 4e, a relief valve 4d, a relief valve holder 4c, a relief spring 4b, and a spring support member 4a. The spring support member 4a also functions as a relief body that includes the relief spring 4b and forms a relief valve chamber. The spring support member 4a (relief body) of the relief valve mechanism 4 is press-fitted into and fixed to a lateral hole formed in the body 1. The relief spring 4b abuts on the spring support member 4a on one end side, and abuts on the relief valve holder 4c on the other end side. The relief valve 4d is pressed against the relief valve seat (seat member 4e) by action of a biasing force of the relief spring 4b via the relief valve holder 4c, thereby blocking the fuel. A valve opening pressure of the relief valve 4d is determined by the biasing force of the relief spring 4b. In the present embodiment, the relief valve mechanism 4 communicates with the pressurizing chamber 11 via a relief passage, but is not limited thereto, and may communicate with a low-pressure passage (the low-pressure fuel chamber 10, the intake passage 10d, or the like). The relief valve mechanism 4 is a valve configured to operate when a certain problem occurs in the common rail 106 or a member beyond the common rail so that the common rail 106 has an abnormally high pressure.

That is, the relief valve mechanism 4 is configured such that the relief valve 4d is open against the biasing force of the relief spring 4b when a pressure difference between the upstream side and the downstream side of the relief valve 4d exceeds the set pressure. The relief valve mechanism 4 has a role of opening the valve when the pressure in the common rail 106 and the members beyond the common rail 106 becomes high, and returning the fuel to the pressurizing chamber 11 or the low-pressure passage (low-pressure fuel chamber 10, the intake passage 10d, or the like). FIGS. 2 and 3 illustrate a structure in which the relief valve mechanism 4 is returned to the pressurizing chamber 11 when the relief valve mechanism 4 is open. Therefore, it is necessary to maintain a closed valve state at a predetermined pressure or less, and the relief spring 4b that is extremely strong is provided to oppose a high pressure.

As illustrated in FIGS. 3 and 4, the intake pipe 5 is attached to a side surface of the body 1 of the fuel pump. The intake pipe 5 is connected to a low-pressure pipe 104 that supplies fuel from the fuel tank 103 of a vehicle, and the fuel is supplied to the inside of the fuel pump from the low-pressure pipe 104. An intake filter 17 in an intake flow path 5a ahead of the intake pipe 5 serves to prevent foreign matters present between the fuel tank 103 and the low-pressure fuel intake port 10a from being absorbed into the fuel pump by the flow of fuel.

The fuel that has passed through the low-pressure fuel intake port 10a reaches an intake port 3k of the electromagnetic intake valve mechanism 3 via the pressure pulsation reduction mechanism 9 and the low-pressure fuel flow path 10d.

In an intake stroke in which the plunger 2 moves in the direction of the cam 91 by the rotation of the cam 91, the volume of the pressurizing chamber 11 increases so that the fuel pressure in the pressurizing chamber 11 decreases. In the intake stroke, an electromagnetic coil 3g is in a non-energized state, and a rod 3i is biased in the valve opening direction (to the right in FIGS. 3 and 4) by a rod biasing spring 3m, so that an anchor 3h is biased by a distal portion of the rod 3i. In this stroke, if the fuel pressure in the pressurizing chamber 11 becomes lower than the pressure of the intake port 3k and a biasing force of the rod biasing spring 3 becomes larger than a front-rear pressure difference of the intake valve 3b, the intake valve 3b is separated from an intake valve seat portion 3a is turned into the open valve state. As a result, the fuel passes through an opening 3f of the intake valve 3b and flows into the pressurizing chamber 11. Incidentally, the rod 3i biased by the rod biasing spring 3 collides with a stopper 3n, and the operation in the valve opening direction is restricted.

After the plunger 2 finishes the intake stroke, the plunger 2 turns to upward movement and shifts to the ascending stroke. Here, the electromagnetic coil 3g is maintained in a non-energized state, and a magnetic biasing force does not act. The rod biasing spring 3m is set to have a sufficient biasing force to keep the intake valve 3b open in the non-energized state. Although the volume of the pressurizing chamber 11 decreases along with the compression movement of the plunger 2, the fuel, once taken into the pressurizing chamber 11, returns to the intake passage 10d through the opening 3f of the intake valve 3b in the open valve state again in this state, the pressure of the pressurizing chamber does not increase. This stroke is referred to as a return stroke.

In this state, when a control signal from the engine control unit 101 (hereinafter referred to as the ECU) is applied to the electromagnetic intake valve mechanism 3, a current flows through a terminal 16 to the electromagnetic coil 3g. When a current flows to the electromagnetic coil 3g, a magnetic attractive force acts between a magnetic core 3e and the anchor 3h, and the magnetic core 3e and the anchor 3h come into contact with each other on a magnetic attraction surface. The magnetic attractive force overcomes the biasing force of the rod biasing spring 3m to bias the anchor 3h, and the anchor 3h is engaged with a rod convex portion 3j to move the rod 3i in a direction away from the intake valve 3b.

Accordingly, the intake valve 3b is closed by a biasing force of an intake valve biasing spring 3l and a fluid force generated by the fuel flowing into the intake passage 10d. After the valve is closed, the fuel pressure of the pressurizing chamber 11 increases along with the upward movement of the plunger 2 to be equal to or higher than the pressure of a fuel discharge port 12a, the fuel is discharged at a high pressure through the discharge valve mechanism 8 and is supplied to the common rail 106. This stroke is referred to as a discharge stroke. Incidentally, a discharge joint 12 is inserted into the lateral hole of the body 1, and the fuel discharge port 12a is formed by an internal space of the discharge joint 12. Incidentally, the discharge joint 12 is fixed to the lateral hole of the body 1 by welding of a welded portion 12b.

That is, the ascending stroke between a lower start point and an upper start point of the plunger 2 includes the return stroke and the discharge stroke. Then, it is possible to control the amount of the high-pressure fuel to be discharged by controlling a timing of energization to the coil 3g of the electromagnetic intake valve mechanism 3. When the electromagnetic coil 3g is energized at an early timing, the proportion of the return stroke is small and the proportion of the discharge stroke is large during the ascending stroke.

That is, the amount of fuel returning to the intake passage 10d is small, and the amount of fuel to be discharged at a high pressure becomes large. On the other hand, if the energization timing is delayed, the proportion of the return stroke is large and the proportion of the discharge stroke is small during the ascending stroke. That is, the amount of fuel returning to the intake passage 10d is large, and the amount of fuel to be discharged at a high pressure becomes small. The energization timing to the electromagnetic coil 3g is controlled by a command from the ECU 101.

Since the energization timing to the electromagnetic coil 3g is controlled as described above, it is possible to control the amount of fuel to be discharged at a high pressure to the amount required by the engine. The discharge valve mechanism 8 on the outlet side of the pressurizing chamber 11 of the body 1 is constituted by a discharge valve seat 8a, a discharge valve 8b, which comes into contact with or separates from the discharge valve seat 8a, a discharge valve spring 8c biasing the discharge valve 8b toward the discharge valve seat 8a, and a discharge valve stopper 8d defining a stroke (movement distance) of the discharge valve 8b. The discharge valve stopper 8d is press-fitted into a plug 8e that blocks a leakage of fuel to the outside. The plug 8e is joined by welding at a welded portion 8f. A discharge valve chamber 8g is formed on the secondary side of the discharge valve 8b, and the discharge valve chamber 8g communicates with the fuel discharge port 12a through a horizontal hole formed in the body 1 in the horizontal direction.

In a state where there is no pressure difference of fuel between the pressurizing chamber 11 and the discharge valve chamber 8g, the discharge valve 8b is crimped to the discharge valve seat 8a by a biasing force of the discharge valve spring 8c and is turned into a closed valve state. The discharge valve 8b is open against the biasing force of the discharge valve spring 8c only when the fuel pressure in the pressurizing chamber 11 becomes larger than the fuel pressure in the discharge valve chamber 8g. When the discharge valve 8b is open, the high-pressure fuel in the pressurizing chamber 11 is discharged to the common rail 106 (see FIG. 1) via the discharge valve chamber 8g and the fuel discharge port 12a. With the above-described configuration, the discharge valve mechanism 8 functions as a check valve that restricts a flowing direction of the fuel.

A low-pressure fuel chamber 10 is provided with the pressure pulsation reduction mechanism 9 that reduces the influence of pressure pulsation, generated in the fuel pump, to the fuel pipe 104. When the fuel, which has once flown into the pressurizing chamber 11, is returned to the intake passage 10d again through the intake valve body 3b that is in the open valve state for capacity control, the pressure pulsation occurs in the low-pressure fuel chamber 10 due to the fuel returned to the intake passage 10d. However, the pressure pulsation reduction mechanism 9 provided in the low-pressure fuel chamber 10 is formed of a metal diaphragm damper, which is formed by affixing two corrugated disk-shaped metal plates together at outer circumferences thereof and injecting an inert gas such as argon into the inside thereof, and the pressure pulsation is reduced by absorption by expansion and contraction of this metal damper.

The plunger 2 has a large-diameter portion 2a and a small-diameter portion 2b, and the volume of the auxiliary chamber 7a is increased or decreased by the reciprocating motion of the plunger. The auxiliary chamber 7a communicates with the low-pressure fuel chamber 10 through a fuel passage 10e. The flow of fuel is generated from the auxiliary chamber 7a to the low-pressure fuel chamber 10 when the plunger 2 descends, and is generated from the low-pressure fuel chamber 10 to the auxiliary chamber 7a when the plunger 2 ascends.

As a result, it is possible to reduce a fuel flow rate to the inside or outside of the pump in the intake stroke or return stroke of the pump so as to serve a function of reducing the pressure pulsation that occurs inside the fuel pump. Hereinafter, the present embodiment will be specifically described with reference to FIGS. 5 and 6.

Figure 5:
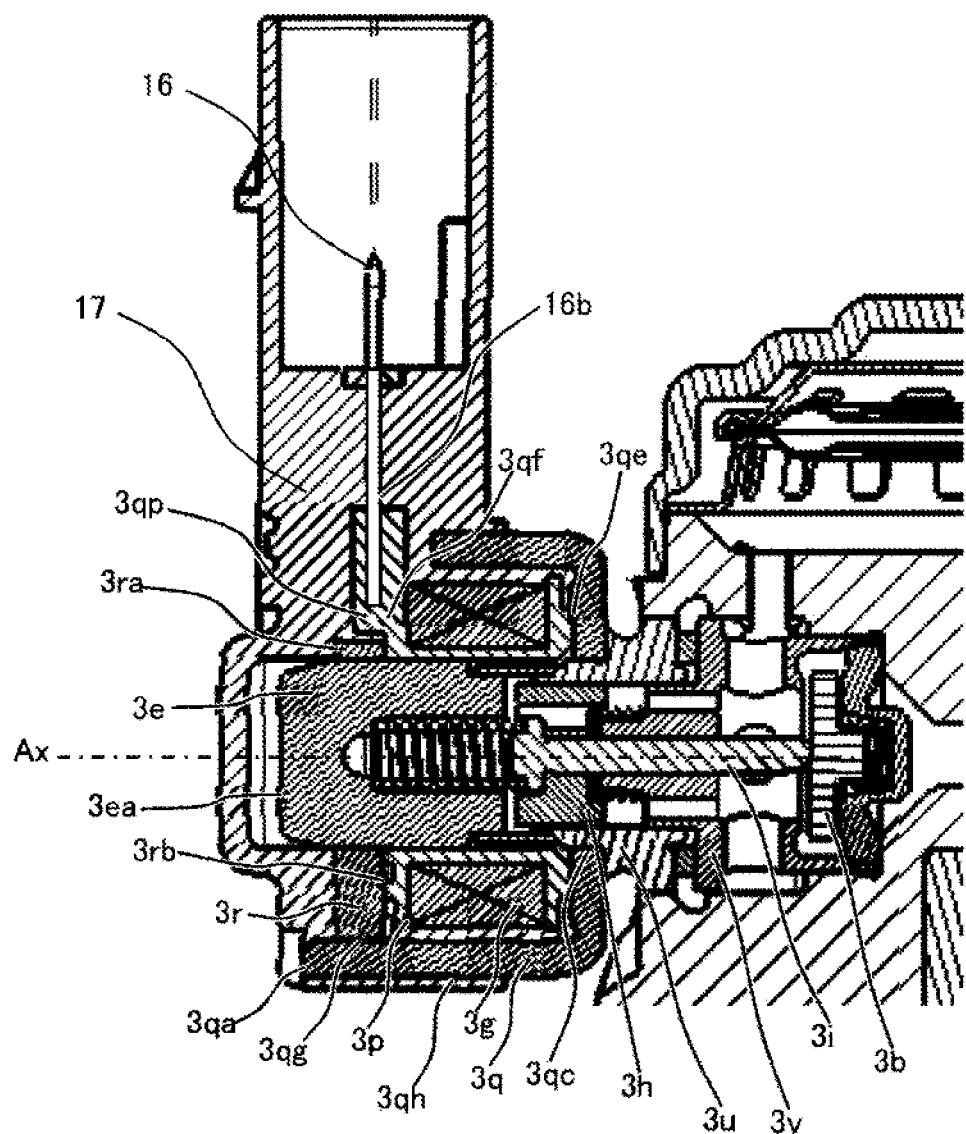
FIG. 5 is a cross-sectional view in an axial direction for describing an electromagnetic intake valve mechanism 3 according to an embodiment of the present invention.
Figure 6:
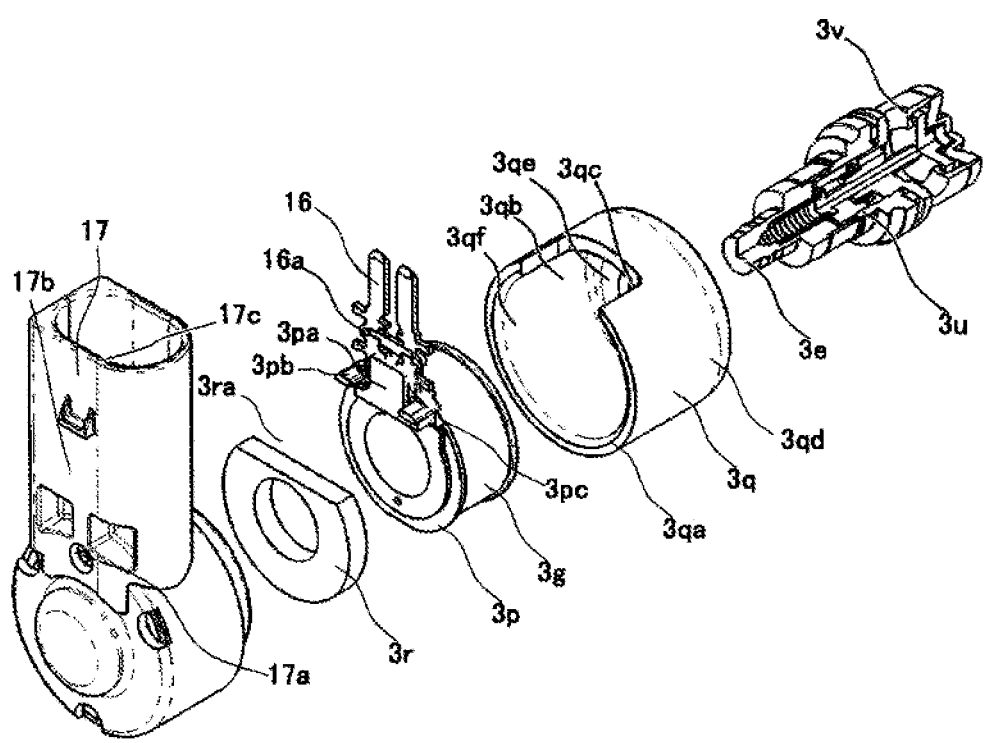
FIG. 6 is an exploded view illustrating main components of the electromagnetic intake valve mechanism 3.

FIG. 5 illustrates a cross-sectional view of the electromagnetic intake valve mechanism 3 of the present embodiment in the axial direction, and FIG. 6 illustrates the main components of the electromagnetic intake valve mechanism 3 in an exploded manner. The fuel pump of the present embodiment includes: the rod 3i that opens or closes the intake valve 3b arranged on the intake side of the pressurizing chamber 11; the movable core 3h that is attracted to the magnetic core 3e (fixed core) by the magnetic attractive force to move the rod 3i; and the coil 3g arranged on the radially outer side the magnetic core 3e or the movable core 3h. The fuel pump of the present embodiment further includes: the cover portion 3r arranged on the axially outer side (left side in FIG. 5) of the coil 3g and having a notch 3ra on the radially outer side; and the terminal member 16 formed radially outward from a position corresponding to the notch 3*ra* and electrically connected to the coil 3*g*. The terminal member 16 is made of metal for causing a current to flow to the coil 3*g*, and may be referred to as a terminal. In addition. the electromagnetic coil 3*g* is formed by winding a wire around an outer peripheral portion of a cylindrical bobbin 3*p* a plurality of times.

That is, the terminal member 16 electrically connected to the coil 3*g* is arranged radially outward in the present embodiment. At this time, a method of arranging the terminal member 16 on the axially inner side (the right side in FIG. 5) of the cover portion 3*r* is also conceivable. In this case, however, not only an increase in size of the electromagnetic intake valve mechanism 3 in the axial direction is caused, but also the distance between the cover portion 3*r* and the coil 3*g* becomes long, so that there is a problem that magnetic circuit characteristics deteriorate. On the other hand, the cover portion 3*r* and the coil 3*g* can be arranged close to each other by arranging the terminal member 16 at the position corresponding to the notch 3*ra* of the cover portion 3*r* according to the above configuration. Therefore, the electromagnetic intake valve mechanism 3 can be miniaturized in the axial direction, and the distance between the cover portion 3*r* and the coil 3*g* can be shortened, so that the magnetic circuit characteristics can be improved.

In addition, the fuel pump of the present embodiment includes the bobbin 3*p* arranged on the radially outer side of the magnetic core 3*e* or the movable core 3*h* and around which the coil 3*g* is wound, and the terminal member 16 is connected to the bobbin 3*p* at the position corresponding to the notch 3*ra*. Specifically, the fuel pump includes the cup-shaped yoke 3*q* arranged on the radially outer side coil 3*g* and the cover portion 3*r*, and the terminal member 16 is connected to the bobbin 3*p* on the radially inner side of a cylindrical side surface portion of the yoke 3*q*. As illustrated in FIG. 6, the bobbin 3*p* has a protruding portion 3*pa* arranged from the radially inner side to the radially outer side with respect to the cylindrical side surface portion of the yoke 3*q*, and the terminal member 16 is fixed by the protruding portion 3*pa*. The bobbin 3*p* and the protruding portion 3*pa* are integrally formed of a non-conductive material such as resin mold and plastic.

A hole 3*qc* is formed in a bottom surface of the yoke 3*q*, and an inner peripheral portion of the hole 3*qc* is press-fitted into an outer peripheral portion of an anchor guide portion 3*u*. An inner peripheral portion of the anchor guide portion 3*u* guides an outer peripheral portion of the anchor 3*h*. The inner peripheral portion of the anchor guide portion 3*u* is press-fitted into an outer peripheral portion of a small-diameter portion of a seat member 3*v* on the side opposite to the anchor 3*h* in the axial direction. The seat member 3*v* forms the seat portion 3*a* in FIGS. 2 and 3, and has a long hole formed at the radial center, and guides the rod 3*i* along an inner peripheral portion of the long hole.

In addition, the coil 3*g* is connected to the terminal member 16 on the radially outer side of the yoke 3*q*. Specifically, the terminal member 16 fixes a wire by sandwiching and crimping the wire from the coil 3*g* in a wire connection portion 16*a*. That is, the wire from the coil 3*g* is welded to the terminal member 16 at the wire connection portion 16*a*. Incidentally, FIG. 6 does not illustrate the wire from the coil 3*g*. In addition, it is desirable that the bobbin 3*p* have a protrusion 3*pb* or a groove (not illustrated) formed along the axial direction (the left-right direction in FIG. 5) of the coil 3*g*, and that the wire of the coil 3*g* be formed to be wound around the terminal member 16 in a state of being in contact with the protrusion 3*pb* or the groove. In addition, it is desirable that a notch 3*pc* for arranging the coil 3*g* wound around the bobbin 3*p* on the axially outer side of the coil 3*g* be formed in the bobbin 3*p*, and that the coil 3*g* arranged from the axially inner side (the right direction in FIG. 5) to the axially outer side (the left direction in FIG. 5) of the notch 3*pc* of the bobbin 3*p* be formed toward the protrusion 3*pb* or the groove located on the radially outer side.

Incidentally, two wires are taken out from the coil 3*g*, and thus, the notches 3*pc* of the bobbin 3*p* are provided symmetrically with the terminal member 16 interposed therebetween, but only one of the notches is denoted by the reference sign in FIG. 6. That is, the fuel pump includes the protrusions 3*pb* or the grooves formed along the axial direction of the coil 3*g* in addition to the notches 3*pc* for arranging the wire of the coil 3*g* wound around the bobbin 3*p* on the radially outer side of the coil 3*g* (left direction in FIG. 5) in the bobbin 3*p*. Further, an interval between both the notches 3*pc* of the bobbin 3*p* is configured to be larger than an interval between the protrusions 3*pb* or the grooves formed in the bobbin 3*p*.

In addition, it is desirable that the wire of the coil 3*g* arranged on the axially outer side (left direction in FIG. 5) from the notch 3*pc* of the bobbin 3*p* be formed toward the protrusion 3*pb* or the groove along the radial direction of the coil 3*g*. That is, the protrusion 3*pb* or the groove is located on the radially outer side of the bobbin 3*p* with respect to the notch 3*pc*, and thus, the wire of the coil 3*g* extending axially outward from the notch 3*pc* of the bobbin 3*p* is arranged along the surface of the bobbin 3*p* toward the wire. More specifically, the wire of the coil 3*g* arranged on the axially outer side from the notch 3*pc* of the bobbin 3*p* is desirably arranged in a state of being in contact with the bobbin 3*p* in the entire region from the notch 3*pc* to the protrusion 3*pb* or the groove of the bobbin 3*p*. Incidentally, the wire of the coil 3*g* is arranged toward the protrusion 3*pb* or the groove formed in the bobbin 3*p* along the circumferential direction after coming out to the axially outer side from the notch 3*pc* of the bobbin 3*p*.

Further, the wire from the coil 3*g* is desirably configured to be wound around the outer periphery of the terminal member 16 on the distal side of the terminal member 16 on the radially outer side after being fixed at the wire connection portion 16*a*. As a result, the wire from the coil 3*g* can be firmly wound around the terminal member 16.

In the present embodiment, the coil 3*g* is wound around the bobbin 3*p*, and a connector 17 is molded using the resin material or the like in the state where the coil 3*g* and the terminal member 16 are electrically connected. A part of the terminal member 16 is embedded in the connector 17, and a part of the terminal member 16 is exposed to the outside, so that the connection with the outside is possible. The connector 17 is molded by melting and pouring a resin material or the like, but there is a possibility that the wire of the coil 3*g* is cut by the pressure at the time of resin molding in a state of being separated from the terminal member 16. On the other hand, it is possible to suppress the possibility that the wire of the coil 3*g* is cut by the pressure at the time of resin molding and to improve the production efficiency by adopting the above configuration.

Incidentally, the resin material or the like is injected at an injection point 17*a* to form the connector 17, but the injection point 17*a* is configured to overlap a circumferential portion 3*qa* of the cylindrical side surface portion of the yoke 3*q* in the radial direction. In addition, the injection point 17 of the connector 17 is formed to be recessed inward from an outer peripheral surface 17*b* of the connector 17. The outer peripheral surface 17*b* of the connector 17 in the longitudinal direction is desirably formed in a substantially linear shape along the radial direction of the coil 3g from a distal portion 17c of the connector 17 to the yoke 3q. In addition, the connector 17 is desirably arranged at a position corresponding to the notch 3ra formed in the cover portion 3r.

In addition, it is desirable that the terminal member 16 be formed in a flat plate shape, and that an axially inner end surface 16b of the terminal member 16 and an axially inner end surface 3rb of the cover portion 3r be formed on the same plane as illustrated in FIG. 5. In addition, the terminal member 16 has two terminals, and the two terminals are arranged radially outward through a hole portion 3qb formed in the cylindrical side surface portion 3qd of the yoke 3q.

According to the above configuration of the present embodiment, the attractive force by which the movable core 3h is magnetically attracted when the coil 3g is energized can be improved, and the electromagnetic intake valve mechanism 3 can be miniaturized. That is, the magnetic circuit can be efficiently formed according to the present embodiment, and thus, the necessary magnetic attractive force can be generated even if the energizing current is reduced, and the power consumption can be reduced.

Therefore, as illustrated in FIGS. 5 and 6, the fuel pump of the present embodiment includes: the coil 3g; the magnetic core 3e that is arranged on the side opposite to the pressurizing chamber 11 with respect to the movable core 3h and attracts the movable core 3h when the coil 3g is energized; the yoke 3q arranged on the radially outer side of the coil 3g; the cover portion 3r that covers the coil 3g from the axially outer side; and the molded portion 17 that covers the radially outer side of the yoke 3q and the axially outer side of the cover portion 3r. In addition, the yoke 3q has a bottom portion 3qe on the pressurizing chamber 11 side and an open portion 3qf on the side opposite to the pressurizing chamber 11, and the cover portion 3r is arranged so as to cover the open portion 3qf. In addition, the inner peripheral portion of the hole 3qc formed in the bottom portion 3qe of the yoke 3q and the outer peripheral portion of the body (anchor guide portion 3u) are fixed by press-fitting.

That is, the cover portion 3r is formed separately from the yoke 3q, and is configured to cover the coil 3g and the bobbin 3p from the axially outer side (left side in FIG. 5) in the present embodiment. Further, the cover portion 3r is arranged on the radially inner side of the yoke 3q and is arranged with a gap between the cover portion 3r and the inner peripheral surface 3qg of the yoke 3q. This gap is desirably set to 5 μm to 60 μm. In this case, it is necessary to hold the cover portion 3r, but it is unnecessary to use another holding member in the present embodiment, and the cover portion 3r can be held together with the cylindrical side surface portion 3qd of the yoke 3q by the molded portion 17. Therefore, the cost can be reduced by reducing the number of components, and a solenoid radiation sound can be reduced by the molded portion 17.

Here, an axially outer end surface 3ea of the magnetic core 3e is located on the axially outer side of an axially outer end surface 3ra of the cover portion 3r in the present embodiment, and thus, there is a possibility that a sound caused by the vibration during the pump operation increases. Therefore, the molded portion 17 is formed to cover the entire axially outer end surface 3ea of the magnetic core in the radial direction in the present embodiment. In addition, the molded portion 17 is formed to cover the entire cover portion 3r in the radial direction. In addition, the molded portion 17 is formed to cover from the axially outer end surface 3qa of the yoke 3q to an axial center portion Ax.

Furthermore, the molded portion 17 is desirably formed in a range from the axially outer end surface 3qa of the yoke 3q over an axial center 3qh of an outer peripheral surface 3qd of the yoke 3q. As a result, the cover portion 3r or the yoke 3q is covered in a wide range by the molded portion 17 so that the solenoid radiation sound can be reduced, and the above problem can be solved.

The molded portion 17 is formed to be in contact with the axially outer end surface 3ra of the cover portion 3r. As a result, it is possible to firmly hold the cover portion 3r. In addition, a space in a predetermined range is formed between the molded portion 17 and the axially outer end surface 3ea of the magnetic core 3e. This is because the coil 3g and the bobbin 3p are first assembled to the yoke 3q, and then, arranged so as to cover the cover portion 3r in the present embodiment. Further, the molded portion 17 is formed by injecting the above-described resin material or the like in a state where these components are integrated. Thereafter, the inner peripheral portion of the hole 3qc formed in the bottom portion 3qe of the yoke 3q and the outer peripheral portion of the body (anchor guide portion 3u) are press-fitted. At this time, the space in the predetermined range is formed between the molded portion 17 and the axially outer end surface 3ea of the magnetic core 3e in consideration of component tolerance. In this manner, manufacturing can be facilitated.

REFERENCE SIGNS LIST 1 body
2 plunger
3 electromagnetic intake valve mechanism
3g coil
3p bobbin
3q yoke
3r cover portion
4 relief valve mechanism
5 intake pipe
5a intake pipe attachment site
6 cylinder
7 seal holder
8 discharge valve mechanism
9 pressure pulsation reduction mechanism
10a low-pressure fuel intake port
11 pressurizing chamber
12 discharge joint
13 plunger seal
17 molded portion

The invention claimed is:
1. A fuel pump comprising:
an electromagnetic intake valve mechanism comprising:
  a body:
  a coil;
  a movable core;
  a magnetic core that is arranged on a side opposite to a pressurizing chamber with respect to the movable core and attracts the movable core when the coil is energized;
  a yoke arranged on a radially outer side of the coil;
  a cover portion that covers the coil from an axially outer side; and
  a molded portion that covers a radially outer side of the yoke and an axially outer side of the cover portion, wherein the yoke includes a bottom portion with a hole formed therein on a side of the pressurizing chamber and an open portion on the side opposite to the pressurizing chamber, the cover portion is arranged to cover the open portion, an inner peripheral portion of the hole formed in the bottom portion of the yoke and an outer peripheral portion of the body are fixed by press fitting, the cover portion is arranged on a radially inner side of the yoke and is arranged with a gap interposed between the cover portion and an inner peripheral surface of the yoke, and the molded portion is formed to be in contact with an axially outer end surface of the cover portion and is formed in a range from an axially outer end surface of the yoke over an axial center of an outer peripheral surface of the yoke.

2. The fuel pump according to claim 1, wherein the cover portion is formed separately from the yoke.

3. The fuel pump according to claim 1, wherein the molded portion is formed to cover a whole axially outer end surface of the magnetic core in a radial direction.

4. The fuel pump according to claim 1, wherein the molded portion is formed to cover the entire cover portion in a radial direction.

5. The fuel pump according to claim 1, wherein the molded portion is formed to cover from an axially outer end surface of the yoke to an axial center portion.

6. The fuel pump according to claim 1, wherein a space is formed between the molded portion and an axially outer end surface of the magnetic core.

* * * * *